United States Patent [19]

Seider

[11] 4,410,266
[45] Oct. 18, 1983

[54] METHOD AND APPARATUS FOR COMBUSTION CONTROL AND IMPROVED OPTICAL PYROMETER RELATED THERETO

[75] Inventor: Seymour Seider, Hewlett Harbor, N.Y.

[73] Assignee: BSC Industries Corp., Woodside, N.Y.

[21] Appl. No.: 180,609

[22] Filed: Aug. 25, 1980

[51] Int. Cl.³ .............................. G01J 5/60; G01J 3/50
[52] U.S. Cl. ....................................... 356/45; 356/418
[58] Field of Search .................... 356/43, 45, 418, 434; 73/355 R, 355 EM

[56] References Cited

U.S. PATENT DOCUMENTS

| | | | |
|---|---|---|---|
| 2,648,253 | 8/1953 | Sweet | 356/45 |
| 3,273,448 | 9/1966 | Kelly | 356/418 |
| 3,368,753 | 2/1968 | Baumgartel et al. | 73/355 R |
| 3,795,918 | 3/1974 | Sunderland | 356/45 |
| 3,833,304 | 9/1974 | Liston | 356/418 |
| 4,083,367 | 4/1978 | Portner et al. | 356/418 |

FOREIGN PATENT DOCUMENTS 1423290  2/1976  United Kingdom ............... 374/127

*Primary Examiner*—William H. Punter
*Attorney, Agent, or Firm*—Posnack, Roberts, Cohen & Spiecens

[57] ABSTRACT

A combustion technique and control is provided by the use of an optical pyrometer by means of which combustion control is afforded in accordance with the inspection of the combustion flame. The preferred optical pyrometer takes the form of an optical pyrometer having a single measurement cell which is alternately exposed to the flame through different filters arranged on a rotating disc driven by a motor. The circuit associated with the optical pyrometer, for purposes of generating control signals, features the use of a synchronous D. C. restorer which establishes a reference level for minimum signal distortion. Also employed is an AGC circuit by means of which one of the signals derived from one of the aforementioned filters is utilized to minimize undesired variations in the results. Gating logic is used to separate the two channels derived from the different filters and actually demultiplexes the two separate channels. It also recognizes a small, synchronous pulse derived from a sync opening on a disc on which the filters are mounted. Low pass filtering and D. C. amplification is employed to provide for filtering of noise and spurious signals and to compensate for duty cycle loss.

7 Claims, 4 Drawing Figures

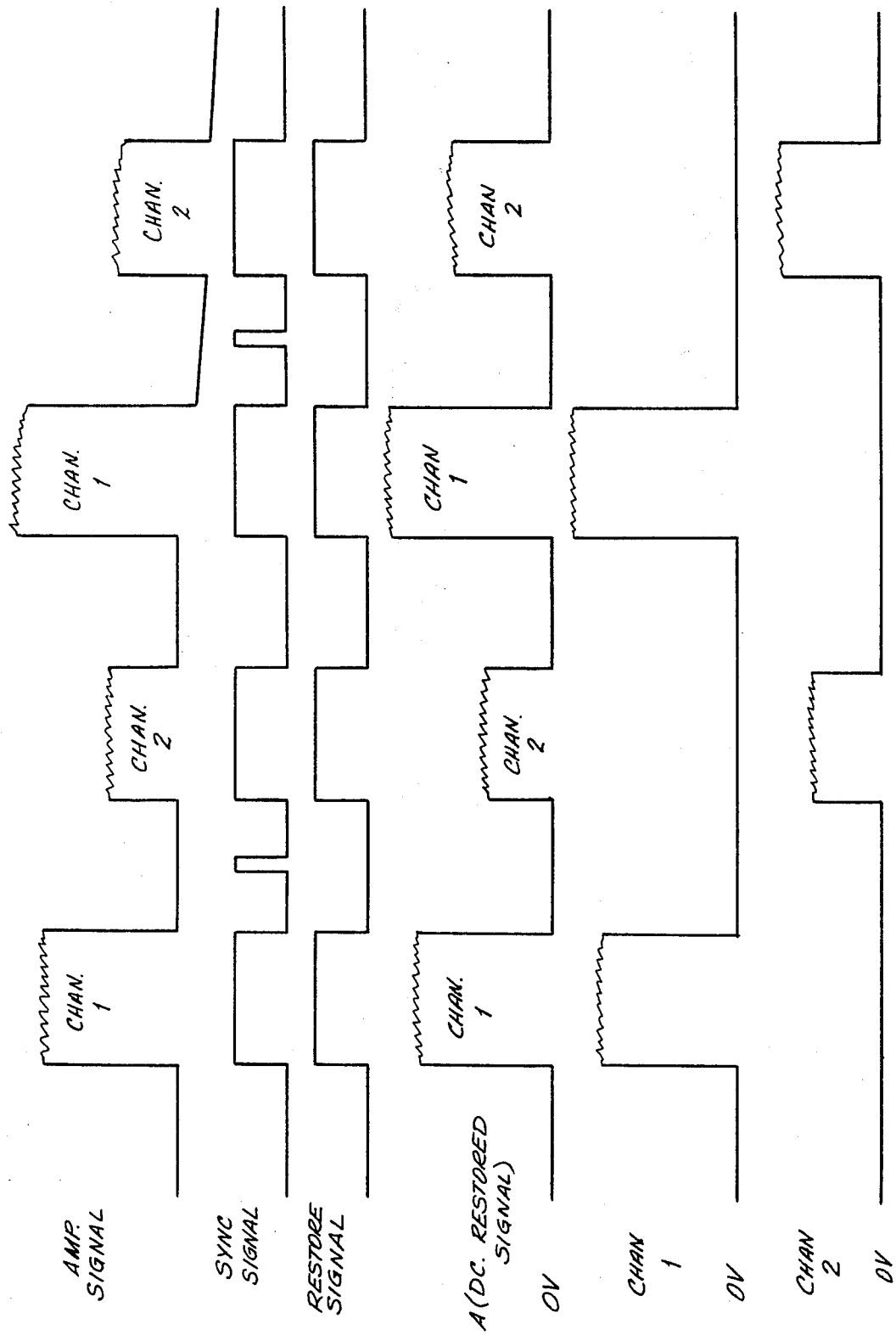

METHOD AND APPARATUS FOR COMBUSTION CONTROL AND IMPROVED OPTICAL PYROMETER RELATED THERETO

FIELD OF INVENTION

This invention relates to combustion control apparatus and methods and more particularly to mechanisms and circuits for controlling the fuel-to-air ratio in combustion chambers. This invention also relates to improved optical pyrometers and to improved circuits relating thereto.

BACKGROUND

Automatic combustion control systems and methods are disclosed in my prior U.S. Pat. Nos. 3,861,855; 3,973,898; and 4,043,743. The present invention relates to improvements thereupon and to systems which may use optical pyrometers such as, for example, disclosed in U.S. Pat. No. 3,795,918, which was granted to J. Sunderland on Mar. 5, 1974.

U.S. Pat. No. 3,973,898 discloses a combustion control effected by the use of a smoke detector and by solid-state devices for the detection and amplification of electrical signals produced by a photoelectric cell for the purpose of controlling a motor which in turn adjusts fuel and air supplies. The electrical circuits disclosed therein include triac switches effective for running a servo-mechanism or motor in one direction or the other according to the density of smoke in a flue venting combustion products from a combustion chamber. Light-emitting diodes are connected to amplifiers for the purpose of indicating the type of control being effected. A smoke-accumulating means is employed for amplifying the products of combustion to facilitate the detecting and measuring of the same.

U.S. Pat. No. 4,043,743 discloses a combustion control system based on the detection of smoke density as in the abovedescribed patent. A photoelectric device measures the intensity of light directed through the smoke by a lamp in order to measure the smoke density. This measurement is employed to control fuel-to-air ratio or the like. To supply a standard reference, light is directed from the lamp through an alternate path not affected by the smoke to the photoelectric device. A shutter mechanism alternately exposes the photoelectric device to the light passing through or circumventing the smoke. The photoelectric measurement is compared with a standard and the comparison is used to adjust circuitry connected to the photoelectric device to stabilize the effects of the latter.

In my previous platents, optical sensors measure the solid particulates in flue gas generated by a combustion process. The highest efficiency combustion, i.e., the highest $CO_2$, occurs just at the visible smoke level, well known as the "light gray haze." The previous patents described how that condition was measured and maintained.

It is well known that the color of an oil-fueled fire is related to completeness of combustion and, hence, to the combustion efficiency. By relating the color to the efficiency as measured by well-known methods such as the Bacharach $CO_2$ tester and then maintaining that color at all times, the highest possible efficiency for that particular combustion equipment and process can be maintained regardless of the constant changes in the varying parameters of the combustion process, such as air temperature and density, fuel temperature, density, viscosity, air/fuel ratio, etc.

The particulate detection method described in the abovementioned patents, while very effective in many cases, has the following shortcomings:

1. The inherent time delay in response to changes in the combustion conditions in the firebox, due to the remote siting of the sensor, in some cases does not permit fast enough correction to prevent short periods, a few seconds, of visible smoke at the stackhead. This is mostly true of steam and air atomizing types of burners, but less in rotary cup types of burners. Such visible smoke is, of course, objectionable from both the efficiency and environmental points of view.

2. The siting of the sensor is critical, even approaching an art. The length of travel of the flue gas in reaching the sensor must be kept as short as possible to avoid the time delay problem. However, the flue gas travel time depends on the physical dimensions of the boiler and are beyond the control of the installer of the sensor.

3. Considerable clearance, about twenty inches minimum, is required on each side of the boiler to permit mounting of the two sensor boxes. This space is sometimes not available.

4. As the sensor must be able to "see" a true sample of the flue gas for every firing condition, this places an additional difficult criterion on the siting of the sensor.

5. In order for this type of sensor to be able to operate at all, some particulate matter must be present in the flue gas in order to permit the sensor to differentiate between the various operating criteria. Thus, it is sometimes difficult to meet the very low levels of particulate matter prescribed in some environmental statutes.

A discussion of the Sunderland U.S. Pat. No. 3,795,918 will follow later.

SUMMARY OF INVENTION

It is an object of the invention to provide improved combustion control apparatuses and methods.

It is another object of the invention to provide improved combustion controls having a reduced time delay response.

It is a further object of the invention to provide improved combustion controls which reduce the criticality of the locating of sensors.

Yet another object of the invention is to provide improved combustion controls which rely upon the spectrum of flames rather than other parameters.

Still another object of the invention is to provide improved optical pyrometer devices for use in combustion control.

Still another object of the invention is to provide improved remote temperature, sensing and measurement devices.

In achieving the above and other of its objectives, the invention provides an apparatus comprising combustion means including flame generating means, flame inspection means for inspecting the color of the flame, and combustion control means responsive to said flame inspection means for controlling said combustion means in accordance with the color of said flame.

According to a further aspect of the invention, there is provided ignition means associated with said flame generating means for initiating said flame upon determining a need for combustion. Said combustion means may include a fuel source heating said flame generating means and said ignition means may be coupled to said fuel source to control the same. The combustion means may furthermore include an air source for the supply of air to said flame and said combustion control means may be coupled to said air source to control the air-to-fuel ratio.

In further accordance with the invention, the flame inspection means includes an optical pyrometer. This optical pyrometer may preferably be a two-color optical pyrometer adapted for inspecting the flame at different wavelengths to obtain a plurality of measurements which are used to operate the combustion control. Moreover, the optical pyrometer, in its preferred version, includes a single control, light-sensitive cell and a plurality of different light filters through which this cell is alternately exposed to said flame and circuit means coupled to said cell and supplying a control signal to said combustion control.

In a specific form, the optical pyrometer may include a disc on which the different filters are mounted and a motor to rotate this disc. The disc is provided with slots corresponding with said filters and the optical pyrometer will include a supplemental cell to detect these slots. The supplemental cell is coupled to the circuit means mentioned above to generate synchronizing signals therein. The disc may furthermore be provided with a synchronizing or sync opening in correspondence with the slots and supplemental cell to enable distinguishing between the slots and thereby between the filters.

The aforementioned circuit means may include a first circuit for generating separate signals corresponding to the filters and a second circuit which is an AGC circuit responsive to one of the separate signals for keeping the same constant and modifying the remainder of the separate signals accordingly.

In still further accordance with the invention, there are specifically provided two different filters and two separate signals and the ratio of these signals is processed to generate a signal corresponding to the color of the flame. This circuit means includes a low-pass filter means to filter this other said signal and a D.C. amplifier to amplify the thusly filtered signal to generate said control signal.

In accordance with yet another feature of the invention, there may be provided a D.C. restorer means to remove distortion from the control signal. It is also preferred that the above-mentioned filters are in the near infrared part of the spectrum. More specifically also the D.C. restorer means mentioned hereinabove may be a synchronous clamp circuit.

The spectrographic detection sensor technique herein described solves the problems of the prior art in that:

1. There is no time delay in response as the sensor is reading the condition of the flame right in the firebox as it occurs.

2. The siting of the sensor is not critical at all. It is set to look into the firebox, and any small portion of the flame will give an adequate sample for an accurate spectrographic analysis.

3. As only one sensor box is required and because its siting is relatively uncritical, mounting on the boiler will rarely, if ever, be a problem.

4. As the spectrographic system essentially maintains a color, there is no need to maintain some particulate level in the flue gas in order to retain control of the fuel/air ratio. With this system it is possible to maintain any color level desired and, hence, any level of particulates in the flue gas.

5. The monitoring of combustion by spectrography results in an immediate response in the fuel/air control mechanism and also results in an automatically controlled fire, controlled for maximum available efficiency at all times, such efficiency level floating with the momentary, varying parameters of the combustion process.

6. This method controls the fire quality only, regardless of flame size, which is instead controlled solely by the load demand on the boiler. Thus, true modulation is achieved. For any and every flame size as required by the load conditions on the boiler, a maximum efficiency condition is achieved and maintained automatically.

In accordance with yet another aspect of the invention, the optical pyrometer provided in accordance therewith constitutes a feature independently of combustion control. This optical pyrometer may be regarded as a device comprising a single light measurement cell with means being provided which include two different filters through which the cell is alternately exposed to the flame.

The aforesaid means may include a disc in which the filters are supported in spaced relation and there may be provided means for rotating the disc to bring the filters alternately adjacent the cell. The disc may furthermore be provided with openings as has been noted hereinabove corresponding to but spaced from the filters, and there will be provided a synchronization light-sensitive cell positioned to be exposed to the light through the aforesaid openings. As has also been noted hereinabove, the disc may be provided with at least one further opening for distinguishing between the filters, and these filters will be adapted to pass different respective wavelengths in preferably the near infrared range.

According to yet another aspect of the invention, there is provided an improved combustion control method. This method will generally comprise controlling combustion in accordance with the color of the flame resulting from the combustion.

According to another aspect of this method, the the flame is inspected through two filters of different wavelengths to derive two signals which are reduced to control the combustion.

The above and further objects, features, and advantages of the invention as well as analysis of the invention with respect to the prior art will be found in the detailed description which follows hereinbelow.

BRIEF DESCRIPTION OF DRAWING

In the Accompanying Drawing:

FIG. 3 is a wave form chart derived from the apparatus of FIG. 2; and

DETAILED DESCRIPTION

According to the invention, there is provided an apparatus in which a boiler is fired by a burner that combines fuel oil or the like with air for combustion in a firebox. The ignition of the fuel-air combination is controlled by a burner ignition controller, which may be any one of a number of commercially available devices. The start-up of the burner and the size of the fire or flame are controlled by a load sensing device such as a thermostat and pressuretrol combination which, again, may be any one of a number of commercially available devices. These devices are not per se part of this invention.

An optical sensor assembly, made up of units to be described hereinafter, monitors the fire or flame and sends signals to an amplifier and two-color pyrometer assembly. This sensor assembly measures the color of the flame and sends an analog signal to an analog-digital converter unit. The digital output of the A/D converter is processed for positioning an air damper control motor, which results in the final control of the fuel-air ratio. This whole process is under the control of certain timing and control logic which provides sequence signals necessary to interpret the color signals and properly adjust fuel-air ratios.

Figure 1:
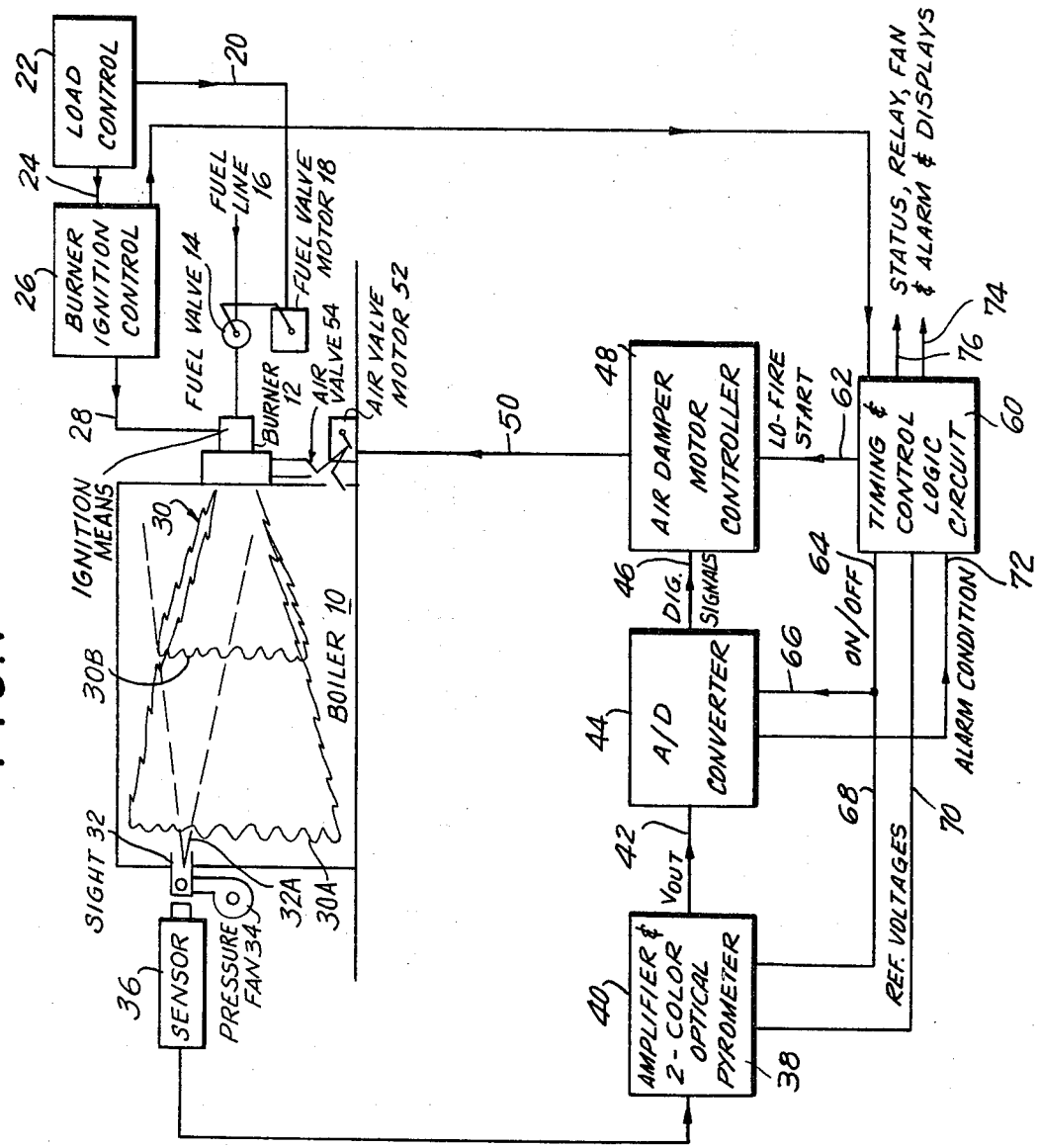
FIG. 1 is a block diagram of a system for combustion control provided in accordance with a preferred embodiment of the invention.

Referring next to FIG. 1, this block diagram diagrammatically illustrates the overall system of the invention. Therein appears a boiler 10 with which is associated a burner 12 to which is connected a fuel valve 14 in turn coupled to a fuel line 16. A fuel valve motor is indicated at 18 and is installed by signals received via line 20 and originating in a load control 22. The load control 22 feeds control signals also via a line 24 to a burner ignition control 26 which in turn issues a control signal via line 28 to the burner 12, which is also known herein as a "flame generating device" which generates or initiates a flame diagrammatically illustrated at 30 which is confined within the combustion chamber of the boiler 10 and which may have, for example, high fire position 30A and low fire position 30B.

On the other side of the combustion chamber from the burner 12 is generally indicated a sight 32 having associated therewith a pressure fan 34, the purpose of which is to avoid the escape of vaporized fuel and combustion products from the combustion chamber. Sight 32 has a sighting angle 32A which fully intercepts positions 30A and 30B. Associated with the sight 32 is a sensor 36 which is part of a two-color optical pyrometer 38 having associated therewith an amplifier 40. Signals generated by amplifier 40 are fed via line 42 to an analog-to-digital converter 44 which then sends digital signals via line 46 to an air damper motor controller 48. Signals are fed from the controller 48 via line 50 to an air valve motor 52, controlling air valve 54 which in turn controls the admission of air into the combustion chamber of boiler 10 and thereby controls air-to-fuel ratio, and thereby the combustion process itself. In general, therefore, it will be observed that an inspection of the flame 30 takes place and is analyzed by the two-color pyrometer to afford a control of the combustion process, in this case, doing so by means of controlling the air valve 54 and therefore the flame. Thus, combustion is controlled in accordance with the color of the flame, as will be explained in greater detail hereinafter.

In addition to the aforegoing circuits, the system illustrated in FIG. 1 includes a timing and control logic circuit 60 feeding a signal to controller 48 via line 62 for purposes of low fire start. On-off signals are fed from circuit 60 to converter 44 and amplifier 40 via lines 64,66, and 68. Reference voltages are fed to the amplifier and pyrometer 38 via line 70. An alarm condition may be fed to the converter 44 via line 72. Other signals representative of a wide variety of such signals may be fed from the circuit 60 via lines 74 and 76 to effect such indications and controls such as status, relay, fan, alarm and various displays.

In accordance with the invention, it is desired to make combustion control responses immediate and accurate, and to do so by the utilization of equipment which is readily manufactured and the cost of which is not prohibitive. Such a type of control may be afforded in accordance with the invention by means of remote temperature measuring devices such as, for example, optical pyrometers and, more particularly, two-color optical pyrometers.

The technique of radiation pyrometry is generally used for temperature measurements. The theory of radiation pyrometry is based on the energy versus wave length distribution which is a function of temperature known as Planck's Law. This distribution is also known as the "blackbody" curve. Every object (gaseous, liquid or solid) heated to a temperature T emits blackbody radiation according to Planck's Law. The area under the related curve represents the total energy emitted by the object at all wavelengths and is proportional to $T^4$. The magnitude, but not shape, of the curve and thus its total energy depends on the emissivity of the object. Emissivity is a measure of how efficient a radiator object is, with a "black" body being the most efficient with emissivity equal to one. The applicable formulae are:

$$H_\lambda = \frac{E_\lambda C_1}{\lambda^5} (e^{C_2/\lambda T} - 1) \text{ Planck's Law}$$

$$H = E\sigma T^4 \text{ Stefan Boltzmann's Law}$$

where:
$H_\lambda$ = energy at wavelength
$E_\lambda$ = emissivity at wavelength
$\lambda$ = wavelength of radiation in microns
$T$ = temperature of object in °K.
$C_1$, $C_2$ = constants
$H$ = total energy over all $\lambda$
$E$ = average emissivity over all $\lambda$
$\sigma$ = Boltzmann's constant Pyrometers may be classified into two general categories: those that make an absolute measurement, and those that make a relative measurement.

Absolute measuring pyrometers attempt to measure temperature by either measuring total energy as in the Stefan Boltzmann Law or by using an optical filter and measuring the energy in a narrow band of the curve. Both approaches suffer from considerable inaccuracies due to the fact that an absolute measurement is being made; emissivity of the object must be known, the total field of view of the object must be used, and the gain of the optical detector and any amplifier must be known exactly, as well as any other factors that could affect gain in the system. This is seldom possible and any one of these many variables could make this approach not viable except for very coarse measurements.

Relative measuring (or two-color ratio) pyrometers are based on the principle of making two measurements at different wavelengths and then calculating the ratio of the two. This resultant is a function of temperature and if the emissivities at the two wavelengths are equal or their ratio is constant (a good assumption if the two wavelengths are close to each other) then most, if not all, of the gain factors which make the absolute measuring pyrometers inaccurate are cancelled since they affect each measurement identically. Using Planck's Law, assuming $e^{C_2/\lambda T} \gg 1$, taking the ratio and solving for T results in:

$$T = C_2 \left( \frac{1}{\lambda_1} - \frac{1}{\lambda_2} \right) \ln \left[ \left( \frac{E\lambda_1}{E\lambda_2} \right) \left( \frac{H\lambda_2}{H\lambda_1} \right) \left( \frac{\lambda_2}{\lambda_1} \right)^5 \right]$$

$E\lambda_1/E\lambda_2$ may equal one or be a constant not equal to one if the object material is known which is generally true. An object of the invention described hereinbelow is to provide a relative measuring pyrometer with as many parts of each channel in common as possible. This practically removes all different transfer gain elements between the two channels.

One known pyrometer which can be used in accordance with the invention is disclosed by J. Sunderland in U.S. Pat. No. 3,795,918. The instrument described in this patent is a two-color ratio pyrometer. Although the two channels are multiplexed through common circuitry, there are two principal disadvantages to the technique described in the patent:

1. It requires two separate optical detector cells. Optical detectors can have substantial unit-to-unit transfer gain variations as well as differences in transfer gain with temperature especially if the two cells are at different temperatures.

2. The electronics is entirely D.C. coupled which has a number of disadvantages. Optical couplers typically have a D.C. bias, the amount of which can vary as the cell ages or with changes in temperature. Additionally, sensitivity of the instrument is sharply limited by D.C. drift in amplifiers. Both of these lead to requirements for zero balance adjustments which are present in the Sunderland device. Drift can cause continual readjustment of the zero balance control to compensate.

Figure 2:
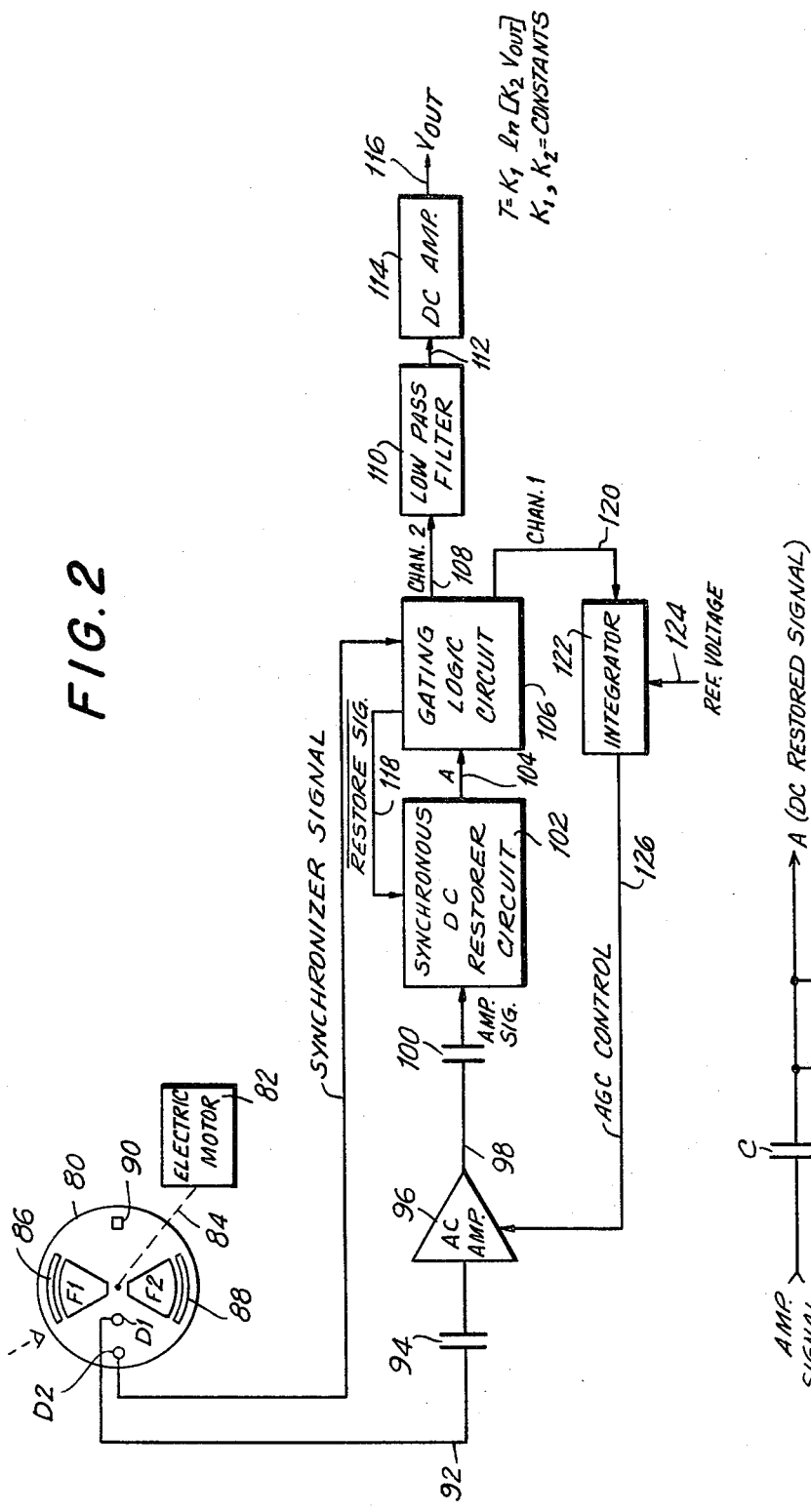
FIG. 2 is a diagram of a portion of a two-color optical pyrometer employed in the apparatus of FIG. 1 in accordance with the invention.

FIG. 2 illustrates a preferred form of optical pyrometer employed in accordance with the invention. The optical pyrometer thus employed includes a rotating disc 80 in which are installed two filters F1 and F2. These filters are filters of different wavelengths adjacent one another in the spectrum and preferably located in the near infrared range as will be discussed hereinbelow. The disc 80 is rotated by an electrical motor 82, the connection of which is diagrammatically indicated at 84.

It will be noted that filters F1 and F2 are pie-shaped sectors having an approximately 25% duty cycle. Also provided in the disc 80 are two arcuate slots 86 and 88 respectively corresponding to filters F1 and F2. A light-sensitive detector D1 is indicated in radial correspondence with the two filters. A second supplemental light detector D2 is also indicated. This light detector is in radial correspondence with the slots 86 and 88 constituting light passing openings in the disc 80. It also corresponds with a further opening 90 which is a synchronizing or sync opening, the purpose of which will become evident hereinafter. It is to be noted, however, that light sensor D1 is the only sensor employed for generating a control signal while the light sensor D2 is merely used for purposes of generating synchronizing signals.

Detector D1 is connected via line 92 through capacitor 94 to A.C. amplifier 96. The A.C. amplifier is connected via line 98 and capacitor 100 to the synchronous D.C. restorer circuit 102. Circuit 102 is connected via line 104 to gating logic circuit 106 connected in turn via line 108 to low-pass filter 110. Filter 110 is connected via line 112 to D.C. amplifier 114 (see amplifier 40) which produces an output voltage signal on line 116 which constitutes the control signal.

A restorer signal is fed back from circuit 106 via line 118 to the restorer circuit 102. Circuit 106 furthermore feeds a signal via line 120 to integrator 122 to which a reference voltage is fed via line 124. An automatic gain control line is indicated at 126, this being a signal fed back to the A.C. amplifier 96 as will be discussed in greater detail hereinbelow.

The preferred system of the invention described hereinabove has neither of the two disadvantages described for the Sunderland pyrometer. One optical detector cell is used and A.C. coupling with synchronous D.C. restoral is utilized in the electronics to remove all effects of channel inasmuch and D.C. drift. Thus, no zero adjustment is required.

FIG. 2 displays a block diagram of the system. As will be described in greater detail, an electric motor spins a round disc containing two optical filters F1 and F2, two open slots containing no filter, and a sync opening. A single control optical detector alternately looks through F1, no target, F2, no target, F1, etc. A supplemental detector is used only to create a synchronizing signal for use by the gating logic and synchronous D.C. restorer. This supplemental detector alternately looks through the open slot corresponding to F1, no target, the sync opening, no target, the open slot corresponding to F2, no target, the open slot corresponding to F1, etc. The sync opening creates a small pulse in the synchronizing signal which enables the gating logic to determine which signal is channel 1 and which is channel 2. The channel 1 signal is processed and used to form an AGC control which keeps the channel 1 output a constant whose value is determined by the reference voltage. The channel 2 output is low pass filtered and D.C. amplified to provide a signal $V_{out}$ related to the temperature of the target object by:

$$T = K_1 \ln[K_2 V_{out}]$$

where: $K_1$, $K_2$ are constants, $K_1$ determined by $C_2$, $\lambda_1$, $\lambda_2$ and the gain of the system, and $K_2$ determined by $$(\lambda_2/\lambda_1)^5 \text{ and } \frac{E\lambda_1}{E\lambda_2},$$

which are the ratios of inband attenuation in the filters, and response differences in the optical detector between $\lambda_1$ and $\lambda_2$, if any. Typical system waveforms are shown in FIG. 3. The amplified signal shows the distortion which comes about in the signal as its average value moves around when the signal is A.C. coupled. This distortion is removed by the synchronous D.C. restorer as shown as signal A. The gating logic separates the two channels. The signal changes are shown exaggerated for clarity in explaining the system operation.

An electric motor is used which can be any small motor capable of spinning the round disc containing the optical filters. The maximum rotational speed of the disc is determined by the optical detector response times. If thermal type detectors are used, this response time is typically quite slow, whereas semiconductor detectors have fast response times. Thus, the disc rotational speed should be matched to the detector used. The optical filters are centered at the wavelengths $\lambda_1$ and $\lambda_2$ and typically are set to be in the near infrared part of the spectrum, e.g., 1–4 microns. $\lambda_1$ and $\lambda_2$ should be chosen such that they are not near any water absorption lines or other common line spectra caused by common chemical reactions. The percent area occupancy on the disc for each filter is shown in FIG. 3 as 25% with the synchronizing slots also occupying 25%. Other percentages can be used but 25% gives equal duty cycle between signal and no signal.

The principles of the D.C. amplifiers amd automatic gain control circuit mentioned hereinabove are well known and do not require further discussion in this text. There should preferably be enough dynamic range in the AGC and A.C. amplifier to handle the range of signals expected from the detector D1.

Figure 4:
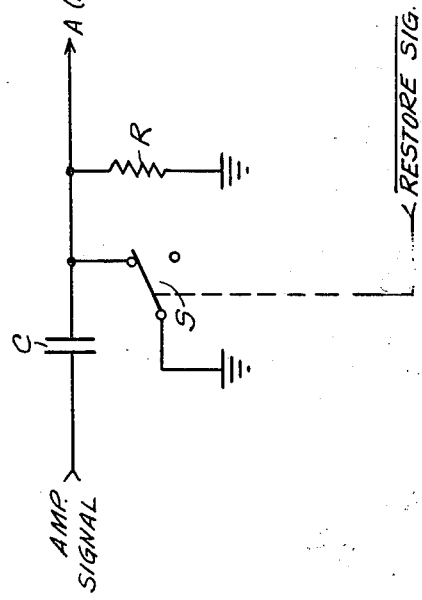
FIG. 4 is a schematic diagram of a synchronous D.C. restorer circuit employed in the circuitry illustrated in FIG. 2.

The synchronous D.C. restorer is essentially a synchronous clamp circuit which establishes ground in synchronism with the no target part of the signal by shorting R (FIG. 4) with switch S. When a signal is present, switch S is open allowing signal to be passed through C to R. R and C are selected such that RC time constant is large enough to pass signal pulses without droop distortion. The average current through C is zero, so that the current passing through R when switch S is open is, on the average, equal and opposite to the current flowing through switch S when it is closed. Thus, for minimal signal distortion, the impedance of switch S in its ON state must be much smaller than the resistance of R.

In the aforesaid circuit, the gating logic circuit 106 generates the restore signal for the synchronous D.C. restorer and also generates gating signals used to separate the two channels and in fact actually demultiplexes the two channels. This circuit recognizes the small sync pulse and uses it for performing the demultiplexing function.

The low pass filter takes the 25% duty cycle channel 2 signal generated by detector 2 and provides averaging so that the signal is continuous and also provides for filtering of the noise and spurious signals. The D.C. amplifier is moreover used to compensate for the duty cycle loss and to provide for any particular signal level that may be required by the system.

From what has been stated hereinabove, it will be apparent that the optical pyrometer used in accordance with the invention may also be used for other purposes as well. The invention therefore relates to an optical pyrometer comprising a single light measurement cell with means including two different filters through which the cell is alternately exposed to the light to be measured. The optical pyrometer of the invention preferably includes a disc in which the filters are supported in spaced relationship with means being provided for displacing or rotating the disc to bring the filters alternately adjacent the aforesaid cell. The disc is furthermore provided with openings corresponding to but spaced from the filters and there may furthermore be provided a synchronization, light-sensitive cell to be exposed to the light through the openings. At least one further sync opening may be provided for distinguishing between the filters.

Also from what has been stated above, it will be obvious that the invention relates further to a method. This method comprises controlling combustion in accordance with the color of the flame resulting from the combustion. The color of the flame is inspected preferably through two filters of different wavelengths, as noted hereinabove, to derive two signals which are used to control the combustion. The flame is inspected alternately through the filters in a preferred embodiment of the invention.

There will now be obvious to those skilled in the art many modifications and variations of the devices, systems, and methods set forth hereinabove. These modifications and variations will not depart from the scope of the invention if defined by the following claims.

What is claimed is:

1. Apparatus comprising combustion means including flame generating means, flame inspection means for inspecting the color of the flame, and combustion control means responsive to said flame inspection means for controlling said combustion means in accordance with the color of said flame, said combustion means includes an air source for the supply of air to said flame, said combustion control means being coupled to said air source to control air-to-fuel ratio, said flame inspection means including an optical pyrometer, said optical pyrometer being a two-color optical pyrometer adapted for inspecting the flame at different wavelengths to obtain a plurality of measurements which are used to operate said combustion control means, said optical pyrometer including a single control light-sensitive cell and two different light filters through which said cell is alternately exposed to said flame, a disc on which said filters are mounted, a motor to rotate said disc, and circuit means coupled to said cell and supplying a control signal to said combustion control means, said disc being provided with slots corresponding with said filters, said optical pyrometer further including a supplemental cell to detect said slots, said supplemental cell being coupled to said circuit means to generate synchronizing signals therein, said disc being further provided with a synchronization opening in correspondence with said slots and supplemental cell to enable distinguishing between said slots and thereby between said filters, said circuit means including a first circuit for generating separate signals corresponding to the filters and a second circuit which is an AGC circuit responsive to one of the separate signals for keeping the same constant and modifying the other of said separate signals accordingly which is processed to generate a signal corresponding to the color of said flame, said circuit means further including low pass filter means to filter said other signal and a D.C. amplifier to amplify the thusly filtered signal to generate said control signal.

2. Apparatus as claimed in claim 1 further comprising ignition means associated with said flame generating means for initiating said flame upon determining a need for combustion.

3. Apparatus as claimed in claim 2 wherein said combustion means includes a fuel source feeding said flame generating means and said ignition means is coupled to said fuel source to control the same.

4. Apparatus as claimed in claim 1 comprising D.C. restorer means to remove distortion from said control signal.

5. Apparatus as claimed in claim 1 wherein said filters are in the near infrared part of the spectrum.

6. Apparatus as claimed in claim 4 wherein the D.C. restorer means is a synchronous clamp circuit.

7. Apparatus as claimed in claim 1 wherein said first circuit includes an A.C. amplifier.

* * * * *